United States Patent [19]
Crain

[11] Patent Number: 5,960,890
[45] Date of Patent: Oct. 5, 1999

[54] WETLANDS TERRACING PLOW AND REMEDIATION METHOD UTLIZING SAME

[76] Inventor: Malcolm L. Crain, P.O. Box 118, Grand Chenier, La. 70643

[21] Appl. No.: 08/976,476

[22] Filed: Nov. 24, 1997

[51] Int. Cl.$^6$ ...................................................... A01B 13/02
[52] U.S. Cl. .......................... 172/166; 172/182; 172/201; 172/540; 172/684.5; 172/701
[58] Field of Search .................................... 172/166, 540, 172/684.5, 701, 182, 201

[56] References Cited

U.S. PATENT DOCUMENTS

| | | |
|---|---|---|
| 746,547 | 12/1903 | Miller . |
| 1,331,382 | 2/1920 | Rolland . |
| 2,644,252 | 7/1953 | Brown . |
| 3,471,953 | 10/1969 | Wvatt . |
| 4,802,293 | 2/1989 | Smith . |

OTHER PUBLICATIONS

"Shallow–Water Terrace Construction Requirements", Talbot, Wayne R., USDA Natural Resources Conservations Services and Coastal Restoration Division Baton Rouge LA, Lousiana Dept. Natural Res., Apr. 1995.

*Primary Examiner*—Christopher J. Novosad
*Attorney, Agent, or Firm*—Joseph T. Regard, Ltd.

[57] ABSTRACT

A terracing plow for providing a shallow water terrace system for wetlands remediation. The preferred, embodiment of the present invention comprises a terracing plow having a frame having front and rear ends and first and second sides, the rear end having a generally medially situated, angled chute member having first and second scalloped coulter blades situated at the first and second sides of the frame, adjacent to the opening of the chute member. The coulter blades are situated on the frame at an angle in relative alignment with the adjacent chute wall. The preferred system of the present invention contemplates pulling the terracing plow via linkage to the front end of the frame through a shallow wetlands, in order to facilitate borrowing of the earth from the marsh bottom and building up same via the chute member, forming a terrace for the planting of marsh grass or the like thereon. An overhead crane may also be provided to suspend the medial portion of the plow frame, for adjusting the relative angle of attack and/or of the plow upon the marsh, depending upon the consistency of the ground.

16 Claims, 7 Drawing Sheets

WETLANDS TERRACING PLOW AND REMEDIATION METHOD UTLIZING SAME

TECHNICAL FIELD OF THE INVENTION

This invention relates to wetlands remediation devices and techniques, and in particular to a terracing plow for providing a shallow water terrace system for wetlands remediation. The preferred embodiment of the present invention comprises a terracing plow having a frame having front and rear ends and first and second sides, the rear end having a generally medially situated, angled chute member having first and second scalloped coulter blades situated at the first and second sides of the frame, adjacent to the opening of the chute member. The coulter blades are situated on the frame at an angle in relative alignment with the adjacent chute wall.

The preferred system of the present invention contemplates pulling the terracing plow via linkage to the front end of the frame through a shallow wetlands, in order to facilitate borrowing of the earth from the marsh bottom and building up same via the chute member, forming a terrace for the planting of marsh grass or the like thereon. An overhead crane may also be provided to suspend the medial portion of the plow frame, for adjusting the relative angle of attack and/or of the plow upon the marsh, depending upon the consistency of the ground.

BACKGROUND OF THE INVENTION

Over the last several years, wetlands preservation has become a significant priority, with the recognition of the substantial loss of wetlands due to development, and commensurate loss of benefit associated with said wetlands due to weather-driven erosion and development, including loss of habitat, as well as the flood control and water purification attributes associated therewith.

Erosion driven by tidal flow and wind, coupled with the creation of canals and other development in coastal marshes have caused irreversible damage, forming large, shallow water pools devoid of vegetation, creating a "mud hole" which will not sustain plant or animal.

Not only has government phased in laws to prevent further destruction of wetlands, but it has also recognized that rehabilitation and remediation of damaged wetlands, and conversion of non-wetlands properties into wetlands, is also a priority, to further stem the damages done to date.

Accordingly, prior art has included techniques of wetlands remediation and conversion, including terracing; further, there have over the years been patented numerous plows, discs, and the like, although all are believed to be distinguishable from the present invention.

In the past, wetlands terraces have been constructed via a dragline, which would scoop mud from a water bottom into a bucket and deposit it to form the terrace. This method tended to leave potholes in the water bottoms and increase the turbidity of the water, further harming the ecosystem, and was expensive, slow and inconsistent in structure.

The following patents are believed to have at least some remote pertinence to the present invention, teaching various plow configurations and the like:

| Patent Number | Inventor(s) | Date of Issue |
| --- | --- | --- |
| 376,145 | Buchet et al | 01/07/1908 |
| 561988 | Harmon | 06/16/1896 |
| 759489 | Weeks | 05/10/1904 |
| 802068 | Case | 10/17/1905 |

-continued

| Patent Number | Inventor(s) | Date of Issue |
| --- | --- | --- |
| 803821 | Grimes | 11/07/1905 |
| 871976 | Whitney | 11/26/1907 |
| 964159 | Grimes | 07/12/1910 |
| 1266532 | Mitchell | 05/14/1918 |
| 1329543 | Northon | 02/03/1920 |
| 1354264 | Miller | 09/28/1920 |
| 1500367 | Caughey | 07/08/1924 |
| 1540161 | Callison | 06/02/1925 |
| 1537091 | Snyder | 05/12/1925 |
| 1575814 | Burson | 03/09/1926 |
| 1719886 | Homan | 07/09/1929 |
| 1731925 | Hester | 10/15/1929 |
| 1888128 | Hester | 11/15/1932 |
| 1951072 | Theiler et al | 03/13/1934 |
| 2615264 | Satterwaite | 10/28/1952 |
| 2708158 | Pursche | 02/05/1957 |
| 2711597 | Werner et al | 06/28/1955 |
| 2749631 | Thompson | 06/12/1956 |
| 2804294 | Megher | 08/27/1957 |
| 2806305 | Ulrich | 09/17/1957 |
| 2838987 | Burton | 06/17/1958 |
| 3045765 | Cox et al | 07/24/1962 |
| 3088527 | Burch | 05/07/1963 |
| 3209840 | Lehman | 10/05/1965 |
| 3265137 | Couser | 08/09/1966 |
| 3275087 | Petitt | 09/27/1966 |
| 3741953 | Wyatt | 10/05/1965 |
| 3841006 | Mironov et al | 10/15/1974 |
| 4215495 | Wagner | 08/08/1980 |
| 4422512 | Hodgson jr et al | 12/27/1983 |
| 4484636 | Hodgson jr | 11/27/1984 |
| 4597452 | Tapphorn et al | 07/01/1986 |
| 5062488 | Lochmiller | 11/05/1991 |
| 5337834 | Tapphorn | 08/16/1994 |

Non-Patent Publication:
"Shallow-Water Terrace Construction Requirements" Talbot, W. R., *National Interagency Workshop on Wetlands: Technology Advances for Wetlands Science* (Apr. 4, 1995, Department of the Interior).

The publication "Shallow-Water Terrace Construction Requirements", Talbot, W. R., *National Interagency Workshop on Wetlands: Technology Advances for Wetlands Science* (Apr. 4, 1995, Department of the Interior) teaches that terracing of wetlands for remediation is not per se new, although it does not appear to discuss methodology of formation.

The above cited patents primarily relate to grading configurations, snow plows, drags, and terracing plows, all of which were distinguishable in some respects from the present invention.

U.S. Pat. No. 1,331,382 issued Nov. 9, 1920 teaches a drag comprising a frame having front and rear ends and first and second sides, the rear end having situated adjacent thereto a chute formed from angled first and second sides.

U.S. Pat. No. 2,644,252 teaches a levee building machine comprising first and second, adjustable angled blades situated to form a chute for forming a terrace.

U.S. Pat. No. 746,547 teaches an "agricultural implement" issued 1903, again teaching first and second, adjustable angled blades situated to form a chute for forming a terrace when dragged through the earth.

U.S. Pat. No. 4,802,293 likewise teaches a variation on the above designs, teaching staggered first and second, adjustable, angled blades for forming a terrace.

U.S. Pat. No. 3,741,953 issued 1969 teaches a "Back-Fill and Tamping Attachment for a Self-Propelled Loader", comprising first and second, adjustable angled blades configured to guide and direct earth into a loader.

The remaining patents contemplate various diverse plow and earthworking device configurations, and should be of general pertinence to the present, searched for invention. Of relevance is the common utilization of scalloped coulters for cutting or plowing earth in conjunction with a plow blade for maneuvering the cut earth.

GENERAL SUMMARY DISCUSSION OF THE INVENTION

Unlike the prior art, the present invention teaches a wetlands remediation device and technique which is relatively inexpensively implemented, while providing an effective, relatively strong earthen terrace in shallow, open waters for the planting of vegetation thereon, contemplating a new and effective design for a terracing plow and system for forming a shallow water terrace system for wetlands remediation.

As indicated, the preferred embodiment of the present invention comprises a terracing plow having a frame having front and rear ends and first and second sides, the rear end having a generally medially situated, angled chute member having first and second scalloped coulter blades situated at the first and second sides of the frame, adjacent to the opening of the chute member. The coulter blades are situated on the frame at an angle in relative alignment with the adjacent chute wall.

In use, the preferred system of the present invention contemplates pulling the terracing plow via marsh buggy or the like linked to the front end of the plow frame through a shallow wetlands, in order to facilitate borrowing of the earth from the marsh bottom and building up same via the chute member, forming a terrace for the planting of marsh grass or the like thereon. An overhead crane may also be provided to suspend the medial portion of the plow frame, for adjusting the relative angle of attack and/or of the plow upon the marsh, depending upon the consistency of the ground.

As a result, the present system forms a consistent, relatively fast and ecologically sound terrace structure, without the potholes, turbidity, and other problems associated with utilizing a drag line to form same. Instead of scooping a bucket load of mud from a water bottom and depositing it to form the earthen structure, the present invention is slid along the shallow water bottom in generally a linear fashion, utilizing a chute and coulter blade system to lift mud from the water bottom to form a terrace system in a progressive fashion, providing a uniform, fast, and non-evasive earthen terrace formation in shallow waters from generally about two to about six feet in depth.

Once formed the terraces have planted thereon vegetation such as smooth cordgrass, or a geofabnic or other erosion-resistant material may be utilized to limit erosion of the newly formed earthen formation.

The terrace may be formed in a system comprising, for example, an array to increase the marsh to water ratio in the eroded area; vegetation on the terrace should provide nutrients and clearer water necessary to attract fish and wildlife back to the area.

It is therefore an object of the present invention to provide a method for remediating wetlands in a relatively cost effective and efficient manner.

It is another object of the present invention to provide a terracing plow particularly suitable for forming terraces for wetlands remediation.

It is another object of the present invention to provide a wetlands remediation system incorporating a terracing device which is pulled across a wetlands area having a water depth of about two to six feet in depth.

It is another object of the present invention to provide a method of forming a terrace in a wetlands in a manner alternative to traditional methods.

It is still another object of the present invention to raise the bottom elevation of a wetlands water bottom to promote the growth of vegetation without damaging the wetlands ecosystem.

Lastly it is an object of the present invention to form a wetlands terrace in a faster, relatively cost effective, yet ecologically sensitive fashion, when compared to traditional methods.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
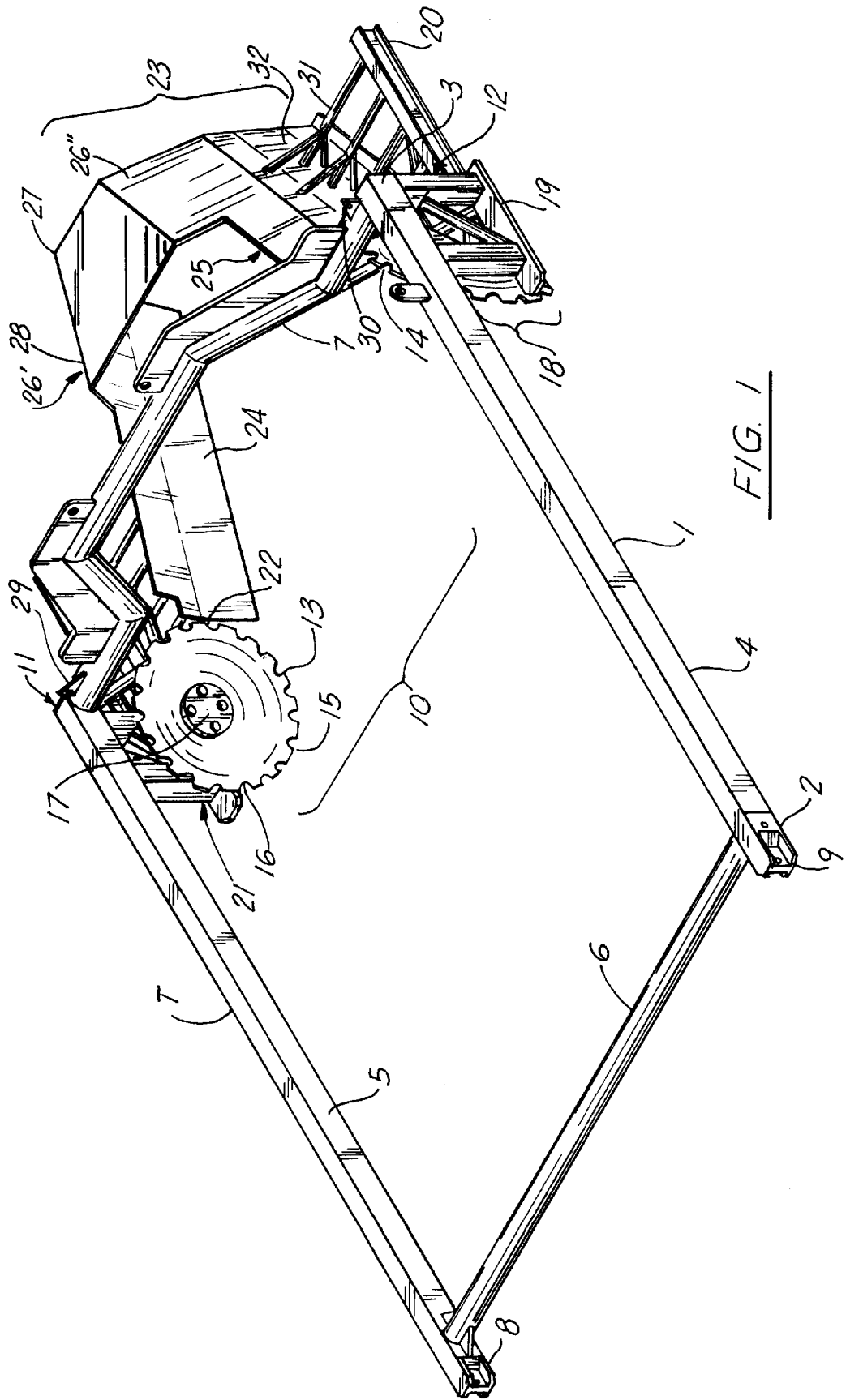
FIG. 1 is an upper, isometric view of the preferred embodiment of the terracing plow of the present invention.
Figure 4:
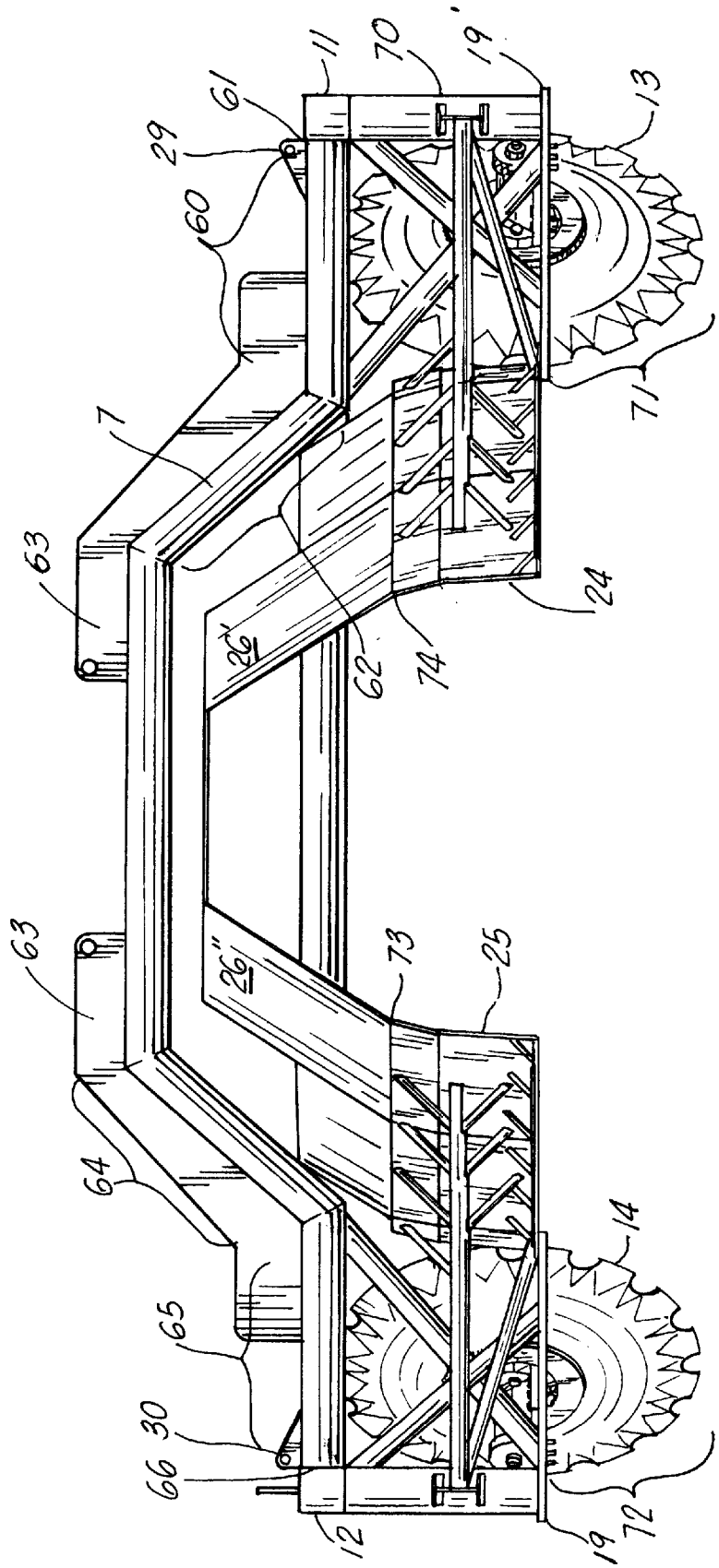
FIG. 4 is a rear view of the invention of FIG. 1, illustrating the chute and blade area of the device.

Referring to FIGS. 1 and 4, the terracing plow T of the present invention comprises a frame 1 having first 2 and second 3 ends formed via first 4 and second 5, opposing side bars, the side bars having juxtaposed therebetween a front end 6 bar mounted between the first 2 ends of said side bars, and a rear end 7 bar mounted between the second 3 end of the side bars, respectively.

Situated in the vicinity of the front end 2 of the frame 1, along opposing ends is first 9 and second 8 front hitches, respectively for connection to apparatus for applying pulling force to the frame.

Situated generally along the second end 3 of the frame 1, beginning between first 12 and second 11 opposing rear corners of the frame and the first 4 and second 5 side bars, respectively, is a terrace forming area 10, comprised of first and second opposing disc structures juxtaposed to the entrance opening of a terrace forming chute.

Figure 3:
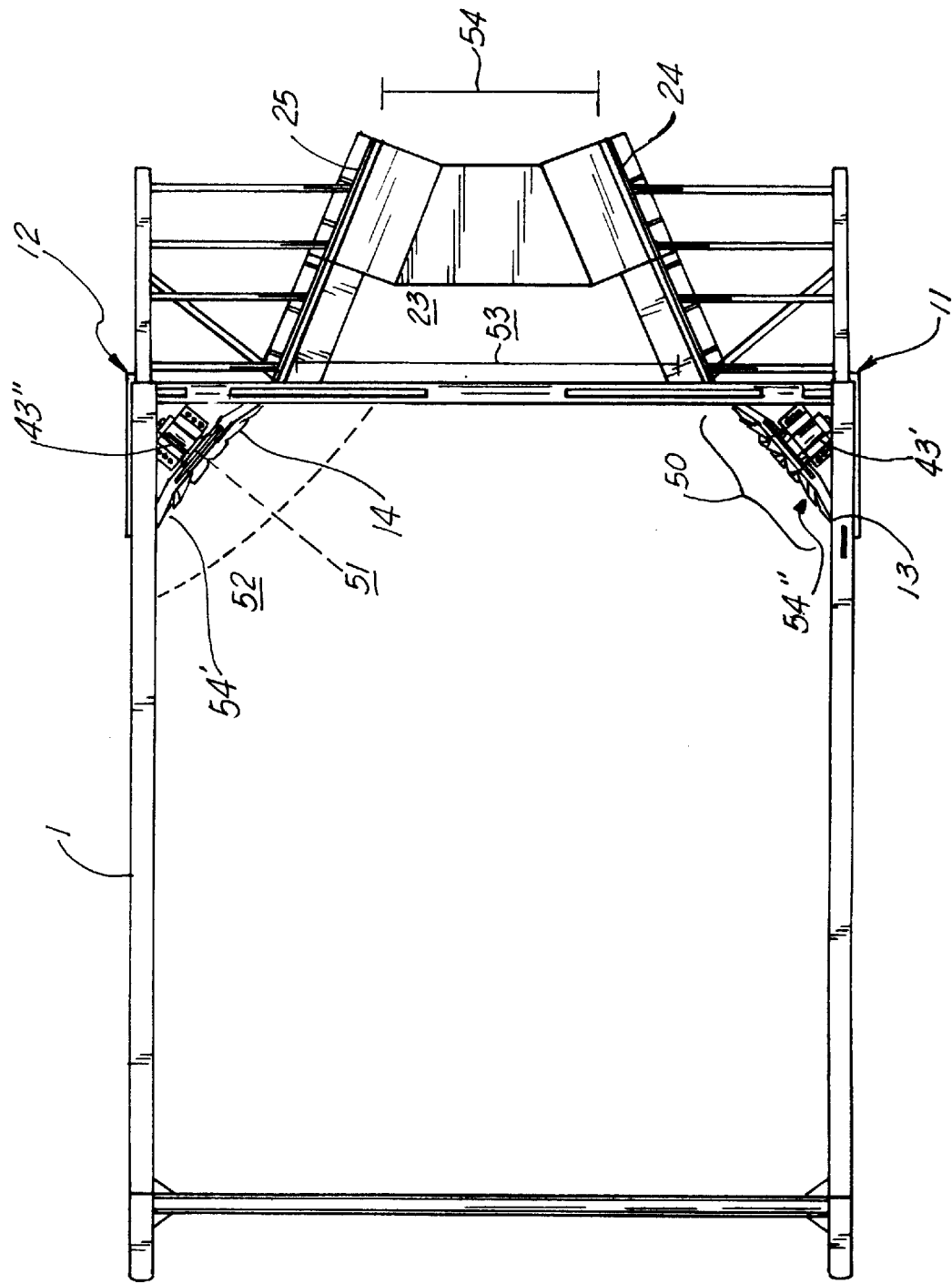
FIG. 3 is a bottom view of the invention of FIG. 1, illustrating the chute and blade area of the device.

Each of the disc structures in the preferred embodiment of the present invention comprises a coulter-type disc having a peripheral edge 15 having scallops 16, 22 formed therein, with each of the discs 14, 13 rotatably attached to mounts 43', 43" mounted in bisecting fashion to the inner corners 11, 12 of frame 1, respectively, as shown in FIG. 3 of the drawings.

Figure 7:
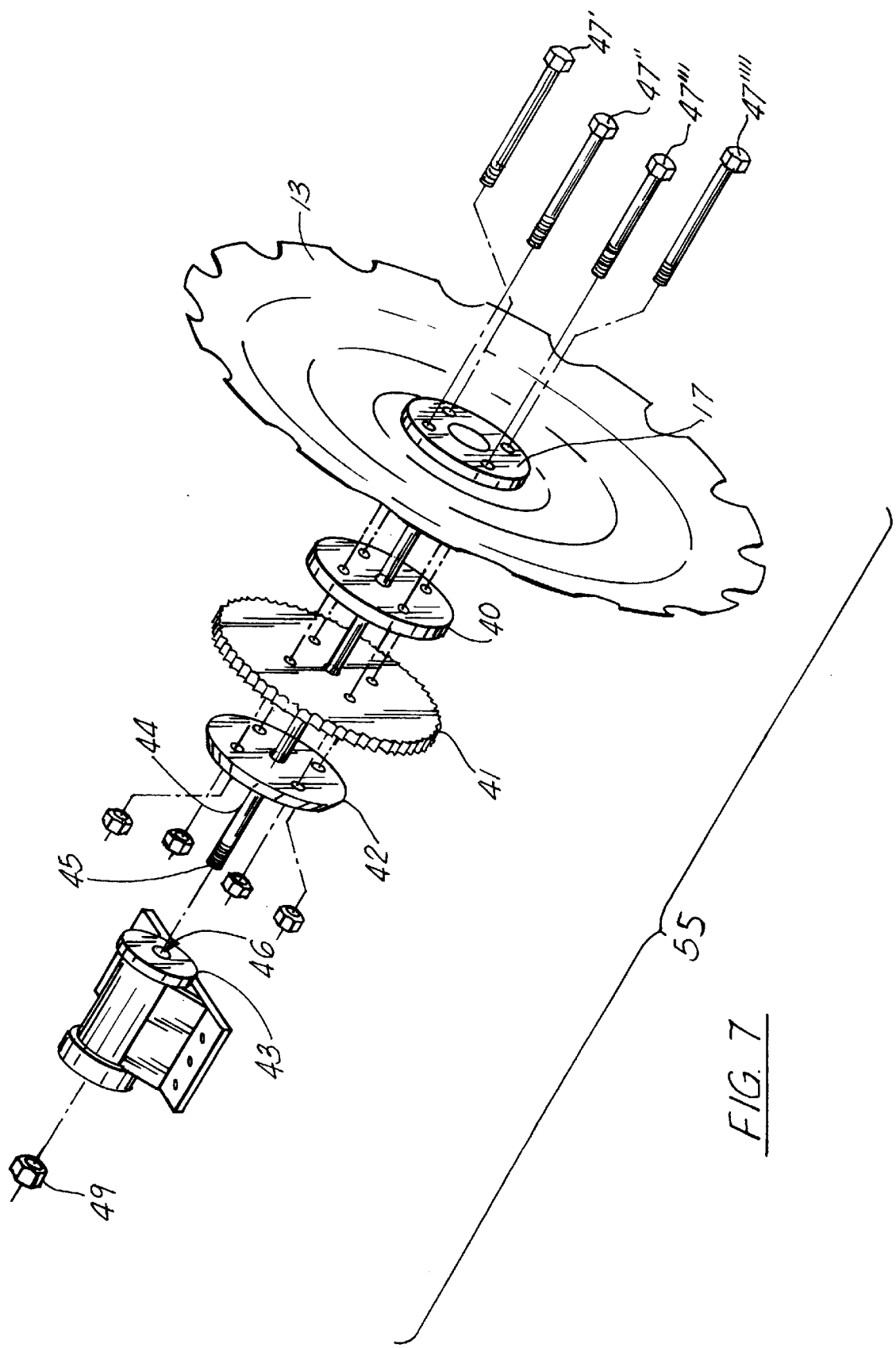
FIG. 7 is an exploded view of an exemplary mounting arrangement for the scalloped coulter blades taught in the invention of FIG. 1.

Referring to FIG. 7, each of the coulter discs (disc 13 shown as an example) is mounted via pivotal axle connection to a mount 43 via, for example, cap 17 affixed to spacer 40, circular cutting blade 41, and backplate 42 via threaded connector 47'–47''', forming a disc/blade combination. The circular blade 41, having a diameter less than the disc, is configured to provide a cutting action to prevent the accumulation of vegetation behind the disc; with the rotation of the disc as the plow moves through the marsh, the circular blade likewise turns.

The disc/blade combination is situated to mount 43 via shaft 44 which passes through conduit 46, and is affixed to mount via threaded connector 49, 45 or the like, the whole combination of FIG. 7 forming a disc cutting component 55.

Continuing with FIG. 3, first and second disc cutting components 54', 54", including discs 13, 14, respectively, is mounted (via mounts 43", 43', respectively) in the preferred embodiment of the invention such that the shaft supporting each disc approximately bisects 51 the respective inner corner (which is shown having about a forty-five degree angle 50, 52, for example) which each respective disc is mounted, forming first and second opposing discs having a medial area therebetween.

Referring to FIGS. 4 and 1, below the first 4 and second 5 side bars in the vicinity of discs 14, 15, respectively there is provided each a horizontal skid 19, 19' spaced below each side bar via support members 18, 21, and corner bar 70. As shown, each disc cutting component 55 is mounted such that a portion of the disc, shown in this case about ½ of the diameter of the disc, emanates 71, 72 below the horizontal skid 19, this lower portion of the disc forming that portion which will penetrate the largest proportion of ground in forming a terrace, as will be further discussed infra.

Referring to FIGS. 1, 3, and 4, beginning at the rear of the frame, in the medial area between the first and second opposing discs 13, 14 is the entrance opening of the terrace forming chute 23, comprising, first and second, opposing lower funnel blades 24, 25 tapering in spaced relationship generally towards one another, as shown in the drawings.

In the preferred embodiment of the present invention, as shown, each funnel blade 24, 25 may be angled along the top edge thereof forming upper blades 26', 26", respectively, which upper blades may be joined via top support member 27 along each upper blades peripheral edge 28.

Referring to FIG. 3, the opening 53 formed by the chute 23 is shown formed generally adjacent to the rear peripheral edge of discs 13, 14, and each of the lower funnel blades 25, 24 are shown at an angle generally aligned with their respective discs. Also, as shown, the space between the blades 24, 25 at the opening narrows to a lesser distance at the exit 54, a decrease of generally about 45% due to the tapering of the blades to form the chute.

Further, as shown in FIGS. 1 and 4, the lower edge of each funnel blade 25, 24 is generally aligned with the depth of skids 19, 19' respectively, with the lower edge 73, 74 of the upper blades generally aligned with or slightly below (for example, 1–4 inches) the height of the side bars, however, the particular spacings of the upper blades vis-a-vis the side bars can vary with size of the unit, particular application, soil characteristics, speed of travel during application, and other variables.

Each of the funnel 24, 25 and/or upper 26', 26" blades may be reinforced via support members 31 along the outer side 32 of the chute supported by tail piece 20 emanating from the skid or adjacent area on the frame.

As shown in FIG. 4, the rear bar 7 of the frame may be formed so as to generally conform with the adjacent terrace forming chute, with first horizontal portions 60, 65 adjacent to the corners 61, 66, respectively, of the frame, second, upwardly angled portions 62, 64 respectively adjoined to the first portions, and an elevated medial portion 63 therebetween, so as to allow for the free flow of soil in use into the chute area. Rear hitches 29, 30 may also be provided to facilitate lifting of the rear end of the frame, as will be further discussed in the use of the system infra.

Figure 2:
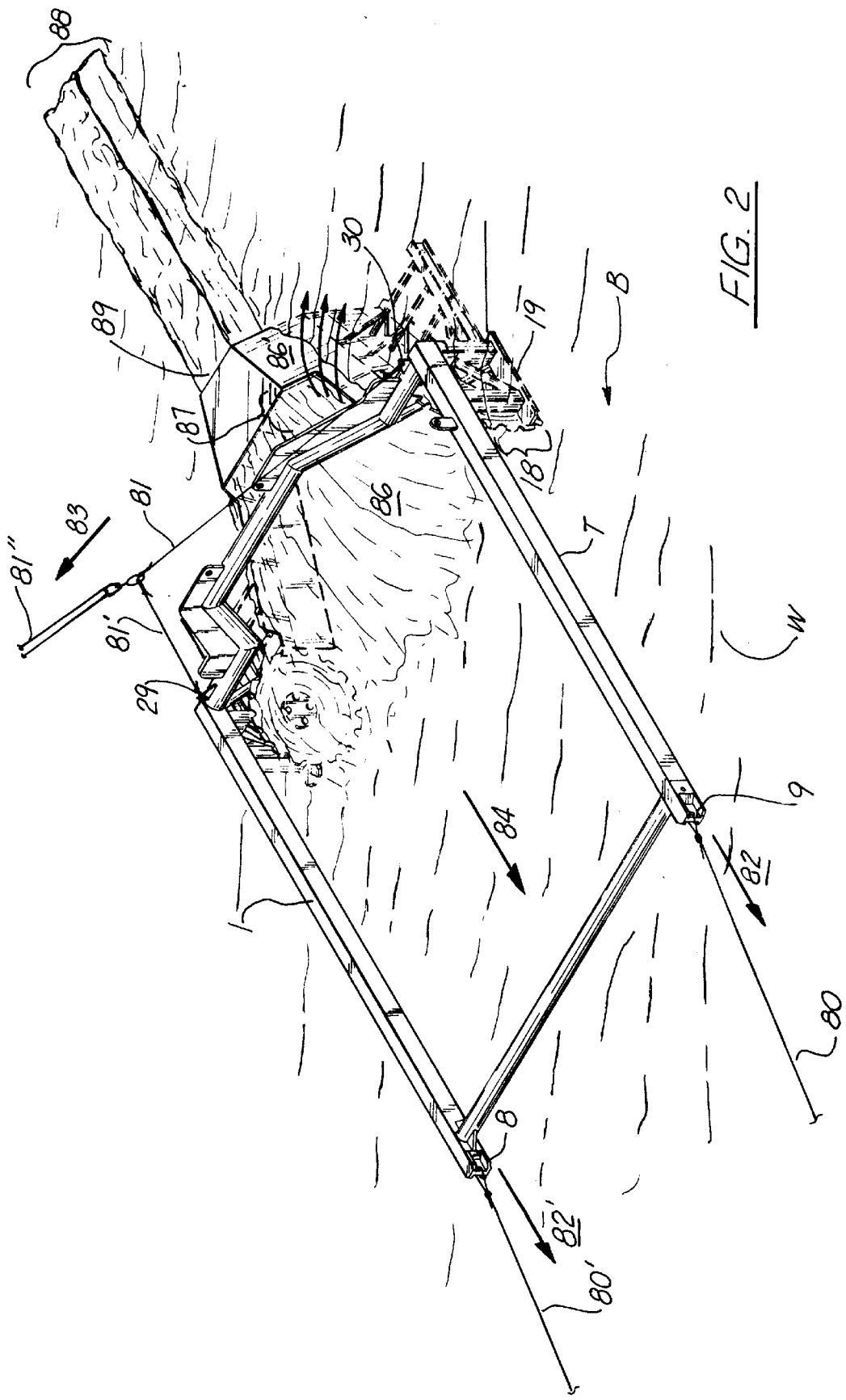
FIG. 2 is an upper, isometric view of the method of forming a terrace utilizing the invention of FIG. 1, wherein the device is pulled through a shallow water marsh area such that the plow lifts and forms a portion of the water bottom into a terrace.

Referring to FIG. 2, the system is utilized in a wetlands area wherein there is generally found surface water. In a ecologically damaged area, erosion is frequently a problem and vast pools of shallow, muddy water are found. The turbidity of the water inhibits the growth of vegetation and living organisms. It has therefore been found to be advantageous to provide shallow water terraces, or small levees or dikes, providing a layer of soil above the water level, in order to provide a base for vegetation growth and a means to prevent further erosion and build up the area, as a springboard for allowing vegetation regrowth and re-habitation.

In order to form a terrace utilizing the device and method of the present invention, generally the water depth is measured to determine the correct size plow. As shown in FIG. 2, the each skid 19 of the unit will rest upon the water bottom B of the area, with the frame 1 of the unit generally supported above the water W level, with the support 18 for each skid having a length approximately corresponding to the depth of the water of the area in which the system is to be applied.

Also, the depth of the water should be considered in determining the right sized discs and chute, so as to form an earthen structure which penetrates the water. The preferred embodiment of the invention contemplates a system wherein sixty percent of the diameter of the disc roughly corresponds to the depth of the water, with the remaining forty percent of the diameter of the disc corresponding to the depth of the trench to be formed in the water bottom. For example, in a water body having a depth of about two feet, a disc having a diameter of about 33–34 inches could be used.

In use, the front hitches 8, 9 of the unit have attached thereto lines 80', 80 respectively which may be engaged to a marsh buggy or the like, to provide forward tension 82', 82 respectively to facilitate forward travel 84 of the unit, and support the front of the frame generally above the water, as desired, a third line 81' may also be provided to a same or separate vehicle, providing lifting force for preventing the system from becoming bogged down, further utilizing first 81' and second 81 lines engaging first 29 and second 30 rear hitches, respectively.

Figure 5:
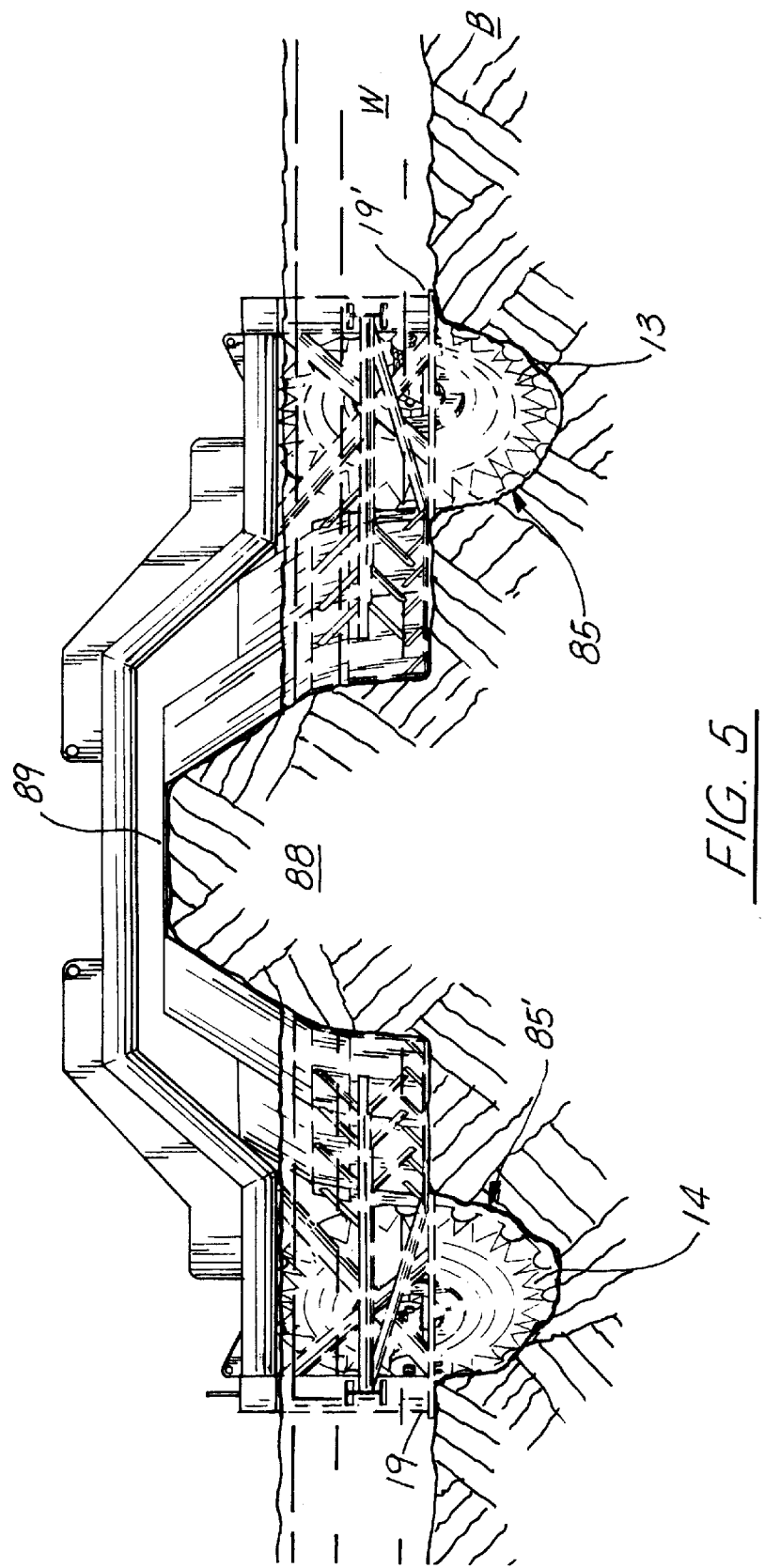
FIG. 5 is a rear, partially cross-sectional, partially cut-away view of the method of FIG. 2, illustrating a cross-sectional view of a terrace formed by the plow, the excavation trenches formed adjacent thereto, and the present invention as is situated during the forming of same.
Figure 6:
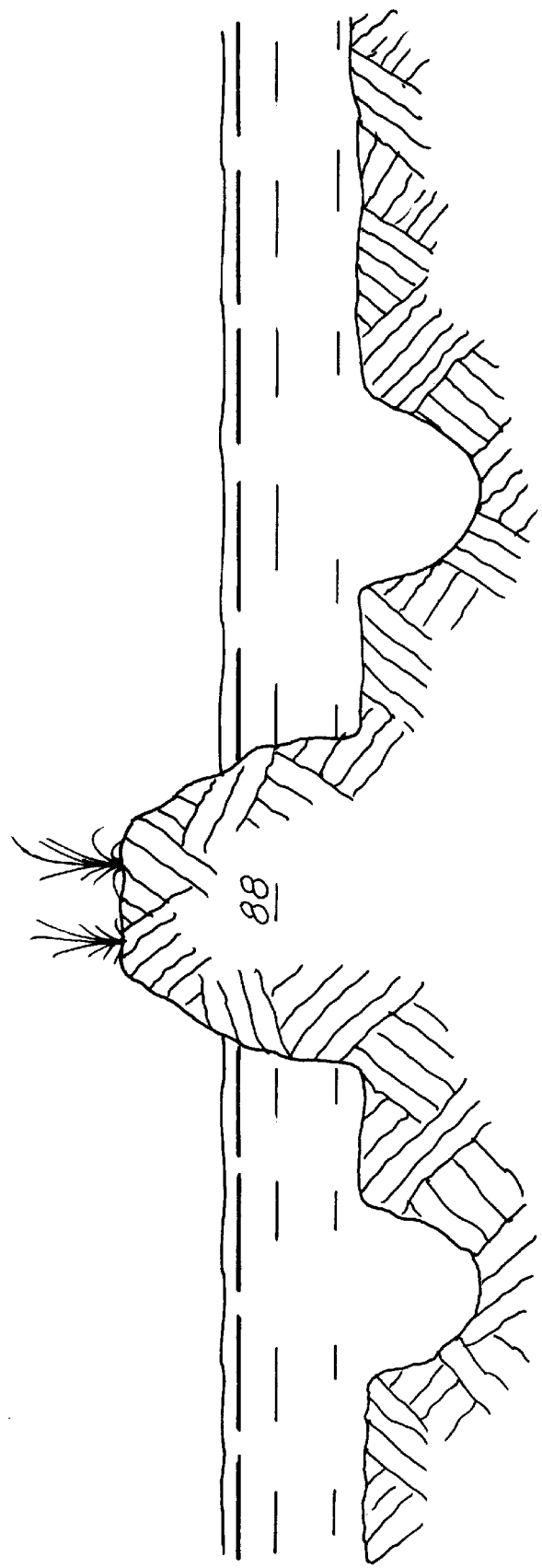
FIG. 6 is a cross-sectional view of the terrace formed via the method of FIG. 2.

With the correct sized unit for the area and the lines secure, forward force 82, 82' is applied via the front lines to force the unit to move in a forward 84 fashion, referring to FIGS. 5 and 2, discs 13, 14, which partially emanate below the skids 19, 19', penetrate the water bottom, and may rotate with the forward travel, displacing soil to form trenches 85, 85', the displaced soil being lifted along the face of the blade and directed 86 by the forward travel of the system through the terrace forming chute. A space 87 formed along the top of the chute allows for water drainage 86', with the soil and decayed vegetation remaining in the chute, being consolidated and lifted by the walls of the chute, finally being compressed by the side and top walls of the chute to a earthen structure having a peak 89 generally above the water level, forming the terrace 88 as shown in FIG. 6.

With the rotation of the discs, the rear cutting blade may cut vegetation and other matter which might gather behind the blades.

Once formed, fast growing, well rooted vegetation such as Cordgrass may be planted upon the terrace directly.

Exemplary Specifications

Exemplary specifications for the preferred, exemplary embodiment of the invention follow, although these applications can vary widely depending upon variable conditions and applications:

Exemplary water depth: about two feet

Height of exemplary terrace to be formed: above the water line (as shown in FIG. 2).

Exemplary disc diameter size: about 33–34 inches

Anticipated range of depth that the above exemplary unit could be utilized: about two feet Anticipated maximum water depth which the present concept could be utilized with a larger unit: about six feet.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A wetlands terracing plow for forming a terrace in a wetland having water and a water bottom, comprising:

a frame having a length and first and second side members, each of said first and said second side members having first and second ends, respectively, said first ends of said first and second side members connected by a front member, said second ends of said first and second side members connected by a rear member;

said frame having mounted thereupon first and second disc members mounted on opposing sides of said frame;

a chute member having a conduit formed therethrough, an opening end, an exit end, and a length, said length of said chute member generally aligned with said length of said frame, said opening end of said chute member juxtaposed between said first and second disc members, said conduit formed in said chute member being wider at said opening end than said exit end.

2. The wetlands terracing plow of claim 1, wherein said first and second disc member each have an inner side, an outer side, and a peripheral edge, and wherein said frame further comprises a first and second skid members spaced generally below said rear member of said frame.

3. The wetlands terracing plow of claim 2, wherein said first and second disc members are mounted to said frame in the vicinity of said first and second skid members, respectively, and wherein a portion of said peripheral edge of each of said first and second disc members is situated below said first and second skid members, respectively.

4. The wetlands terracing plow of claim 3, wherein said chute member includes an top support member engaging the first and second side members.

5. The wetlands terracing plow of claim 3, wherein said disc members are rotatingly mounted to said frame.

6. The wetlands terracing plow of claim 5, wherein there is further provided a circular cutting blade having a cutting edge mounted in rotating fashion to said frame adjacent to said inner side of each of said first and second disc members.

7. A method of forming a terrace in a wetland having water having a water level and a depth, and a water bottom, comprising the steps of a. providing a terracing plow, comprising:
    a frame having a length and first and second side members, each said first and second side members having first and second ends, and first and second sides;
    a chute member having a conduit formed therethrough, an opening end, an exit end, and a length, said length of said chute member generally aligned with said length of said frame, said conduit formed in said chute member being wider at said opening end than said exit end;
b. pulling said frame generally along its length;
c. trenching a portion of said water bottom, providing loose earth;
d. diverting said loose earth and surrounding water into said chute member;
e. allowing said chute member to consolidate said loose earth, while draining water from said loose earth;
f. forming an terrace structure.

8. The method of claim 7, wherein there is provided after step "e" the additional step of planting vegetation on said terrace structure.

9. A wetlands terracing plow for forming a terrace in a wetland having water and a water bottom, comprising:

a frame having a length and first and second side members, each said first and second side members having first and second ends;

said frame having mounted thereupon first and second disc members mounted on opposing sides of said frame;

a chute member having a conduit formed therethrough, an opening end, an exit end, and a length, said length of said chute member generally aligned with said length of said frame, said opening end of said chute member juxtaposed between said first and second disc members, said conduit formed in said chute member being wider at said opening end than said exit end.

10. The wetlands terracing plow of claim 9, wherein said first and second disc member each have an inner side, an outer side, and a peripheral edge, and wherein said frame further comprises a first and second skid members spaced generally below said rear member of said frame.

11. The wetlands terracing plow of claim 10, wherein said first and second disc members are mounted to said frame in the vicinity of said first and second skid members, respectively, and wherein a portion of said peripheral edge of each of said first and second disc members is situated below said first and second skid members, respectively.

12. The wetlands terracing plow of claim 11, wherein said chute member includes an top support member engaging the first and second side members.

13. The wetlands terracing plow of claim 11, wherein said disc members are rotatingly mounted to said frame.

14. The wetlands terracing plow of claim 11, wherein there is further provided a circular cutting blade having a cutting edge mounted in rotating fashion to said frame adjacent to said inner side of each of said first and second disc members.

15. A method of forming a terrace in a wetland having water having a water level and a depth, and a water bottom, comprising the steps of a. providing a terracing plow, comprising:
    a frame having a length and first and second side members, each said first and second side members having first and second ends, and first and second sides;

said frame having mounted thereupon first and second disc members mounted on opposing sides of said frame, said first and second disc members each having an inner side, an outer side, and a peripheral edge, and wherein said frame further comprises a first and second skid members spaced generally below said rear member of said frame, wherein said first and second disc members are mounted to said frame in the vicinity of said first and second skid members, respectively, and wherein a portion of said peripheral edge of each of said first and second disc members is situated below said first and second skid members, respectively;

a chute member having a conduit formed therethrough, an opening end, an exit end, and a length, said length of said chute member generally aligned with said length of said frame, said opening end of said chute member juxtaposed between said first and second disc members, said conduit formed in said chute member being wider at said opening end than said exit end;

b. lowering said frame into said body of water such that said skid members contact said water bottom;

c. pulling said frame generally along its length;

d. allowing said first and second disc members to engage said water bottom, trenching a portion of said water bottom, providing loose earth;

e. diverting said loose earth and surrounding water into said chute member;

f. allowing said chute member to consolidate said loose earth, while draining water from said loose earth;

g. forming an terrace structure.

16. The method of claim 15, wherein there is provided after step "e" the additional step of planting vegetation on said terrace structure.

* * * * *